United States Patent [19]
Kimura et al.

[11] Patent Number: 4,980,141
[45] Date of Patent: Dec. 25, 1990

[54] HEXAGONAL-BIPYRAMID CRYSTALLINE SCANDIUM OXIDE POWDER AND A PROCESS FOR PREPARING THE SAME

[75] Inventors: Etsuji Kimura, Kasukabe; Hisao Nakanishi, Nagaokakyo, both of Japan

[73] Assignees: Mitsubishi Kinzoku Kabushiki Kaisha, Tokyo, Japan; Mitsubishi Denki Kabushiki Kaisha, Tokyo, Japan

[21] Appl. No.: 198,303

[22] Filed: May 25, 1988

[30] Foreign Application Priority Data

May 26, 1987 [JP] Japan .................................. 62-127216

[51] Int. Cl.$^5$ ............................................ C01F 17/00
[52] U.S. Cl. ...................................... 423/263; 423/21.1
[58] Field of Search ...................... 423/21.1, 21.5, 263; 156/DIG. 114, DIG. 63

[56] References Cited
PUBLICATIONS

Bailor, Jr. et al., Comprehensive Inorganic Chemistry, 1972, p. 345.
Horovitz et al., Scandium Its Occurance, Chemistry, Physics, Metallurgy, Biology and Technology, 1975, p. 156.
"Crystal structure of particles in internally oxidized nickel alloys" by Alenkin et al., Fiz. Met. Metalloved, 41(2)375–81, 1976.

Primary Examiner—John Doll
Assistant Examiner—Steven J. Bos
Attorney, Agent, or Firm—Oblon, Spivak, McClelland, Maier and Neustadt

[57] ABSTRACT

Hexagonal-bipyramid crystalline scandium oxide powder and a process for preparing the same are disclosed. The process comprises forming scandium oxalate from an acid aqueous solution containing scandium in the presence of chloride ions and ammonium ions, collecting the precipitate and heating the collected precipitate. Hexagonal-bipyramid crystalline scandium oxide is useful for making electron gun for cathode ray tubes.

1 Claim, 3 Drawing Sheets

100 μm

100 μm

10 μm

HEXAGONAL-BIPYRAMID CRYSTALLINE SCANDIUM OXIDE POWDER AND A PROCESS FOR PREPARING THE SAME

FIELD OF THE INVENTION

This invention relates to hexagonal-bipyramid crystalline scandium oxide powder and a process for preparing the same. The hexagonal bipyramid crystalline scandium oxide powder is suitable for making electron guns for cathode ray tubes.

BACKGROUND OF THE INVENTION

The following processes have been known for preparation of scandium oxide.

(a) A process for preparing scandium oxide comprising causing hydrolysis of an acid aqueous solution containing scandium by adding ammonium hydroxide, sodium hydroxide or the like to form a precipitate of scandium hydroxide, collecting the precipitate and roasting it to obtain scandium oxide.

(b) A process for preparing scandium oxide comprising forming a precipitate of scandium carbonate by adding sodium carbonate, ammonium carbonate or the like to an acid aqueous solution containing scandium, collecting the precipitate and roasting it to obtain scandium oxide.

(c) A process for preparing scandium oxide comprising forming a precipitate of scandium oxalate by adding oxalic acid to an acid aqueous solution containing scandium, collecting the precipitate and roasting it to obtain scandium oxide.

In the processes of (a) and (b), the obtained precipitates are colloidal and their filtration is extremely difficult, and the efficient recovery of scandium oxide is impossible. Further, the scandium oxide obtained by roasting the scandium hydroxide or scandium carbonate is in the coagulated state and it becomes a mixture of coarse particles and extremely fine particles when crushed and pulverized, that is, it cannot be obtained with a uniform particle size distribution.

The scandium oxalate obtained by the process of (c) is easy to filtrate. However, the scandium oxide powder obtained by thermal decomposition of the thus obtained oxalate is planar or columnar.

At any rate, hexagonal-bipyramid crystalline scandium oxide of powder has not been obtained.

We attempted to improve the process (c) in order to obtain scandium oxalate precipitate having good filterability by modifying the composition of the mother liquor and appropriate selection of the oxalic acid compound to be used, and we have found that hexagonal-bipyramid crystalline scandium oxide powder can be obtained by forming scandium oxalate precipitate in the presence of chloride ions and ammonium ions.

DISCLOSURE OF THE INVENTION

This invention provides hexagonal-bipyramid crystalline scandium oxide powder. Also this invention provides a process for preparing hexagonal-bipyramid crystalline scandium oxide powder comprising forming scandium oxalate from an acid aqueous solution containing scandium in the presence of chloride ions and ammonium ions, collecting the precipitate and heating the collected precipitate.

As preferred embodiments of the invention, (a) scandium oxalate is precipitated by adding oxalic acid and ammonium chloride to nitric acid solution or sulfuric acid solution containing scandium, (b) scandium oxalate is precipitated by adding ammonium oxalate to a hydrochloric acid solution containing scandium.

As an acid solution containing scandium, a solution prepared by dissolving scandium oxide, scandium hydroxide, scandium carbonate, etc. in a solution of hydrochloric acid, nitric acid or sulfuric acid, etc. Scandium oxalate is formed in the above described acid solution containing scandium in the presence of chloride ions and ammonium ions.

The aforesaid solution containing scandium should have a pH of not higher than 4, and the pH should preferably be close to 1 at the time the precipitate is formed. The solubility of scandium oxalate is minimum at a pH close to 1, and, therefore, the precipitate is easily formed, and thus high yield is achieved. At pH's above 4, the starting material, scandium oxide, does not dissolve.

When a hydrochloric acid solution is used, chloride ions need not be added. When the acid solution is of nitric acid or sulfuric acid, hydrochloric acid or a chloride salt is added. The most preferred chloride is ammonium chloride, since this substance can introduce both ammonium ions and chloride ions to the reaction system. Metal salts such as sodium chloride, potassium chloride, etc. are not desirable, since involvement of these metals in the scandium oxalate precipitate from the mother liquor is inevitable and hinders production of high purity scandium oxide.

Ammonium ions can be introduced into the reaction system by ammonium hydroxide which is used for adjustment of pH. Or, when ammonium oxalate is used as a precipitant, the ammonium ions are introduced thereby.

When a hydrochloric acid solution containing scandium is used as the scandium source and ammonium oxalate is used as the precipitant, chloride ions and ammonium ions are introduced without need for any separate procedures.

The functions of the chloride ions and ammonium ions as described above are not clearly understood. But it is fact that hexagonal-bipyramid crystalline scandium oxide powder is obtained only when both chloride ions and ammonium ions are present, and such scandium oxide powder cannot be obtained with only one of them.

The amounts of chloride ions and ammonium ions to be added are not specifically limited.

The precipitate is formed either at room temperature or at an elevated temperature. At room temperature, the precipitate is formed in several minutes, but if the reaction system is heated when the precipitate is formed, the time required for formation of the precipitate is shortened.

The formed scandium oxalate precipitate is preferably aged in the mother loquor for thirty minutes or more.

The collection of the precipitate is usually carried out by filtration. However, any method, including decantation, can be employed.

Hexagonal-bipyramid crystalline scandium oxide powder is obtained by collecting the precipitate and roasting or thermally decomposing it. A heating temperature of 650°–800° C. and a heating time of about 2 hours are usually satisfactory. The scandium oxide powder obtained by the above-described heat treatment is not sintered but is a fine powder having an average particle size of 8–12 μm.

Hexagonal-bipyramid crystalline scandium oxide powder can be easily prepared from scandium-containing acid solution by the process of the present invention.

Especially, the scandium oxide powder obtained from the scandium oxalate formed by adding oxalic acid and ammonium chloride to a scandium-containing nitric acid or sulfuric acid solution, or the that obtained from the scandium oxalate formed by adding ammonium oxalate to scandium-containing hydrochloric acid solution is free from contamination with metal impurities such as alkali metals and, therefore, it is a high purity product.

BRIEF EXPLANATION OF THE ATTACHED DRAWINGS

SPECIFIC DESCRIPTION OF THE INVENTION

Now the invention will be explained in detail by way of preferred working examples and comparative examples.

EXAMPLE 1

Figure 1:
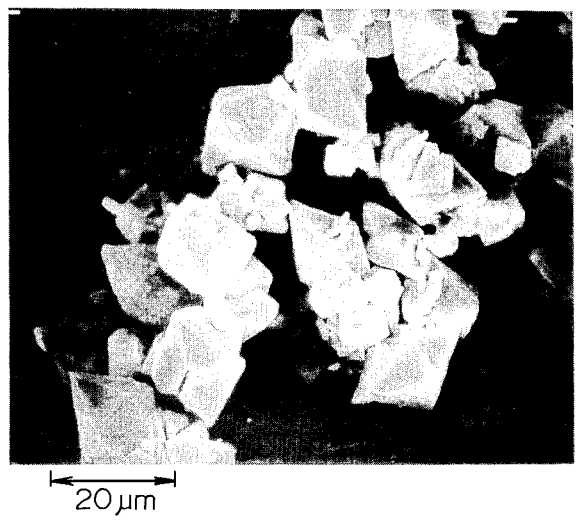
FIGS. 1 and 2 are scanning electron microphotographs showing the particle structures of scandium oxide powders obtained by Example 1 and Example 2 respectively.

To 12 g of scandium oxide, 120 ml of hydrochloric acid and 60 ml of water were added and heated to dissolve it. The solution was boiled down to 40 ml, water and hydrochloric acid being evaporated. Thereafter, water was added to the concentrated solution to make a 1 l solution having a pH of 1. This solution was warmed to 60° C., and 37.8 g of ammonium oxalate monohydrate was added to form scandium oxalate precipitate. After the precipitate was aged in the mother liquor for 1 hour, it was collected by filtration and roasted at 900° C. for 2 hours in the air. A scanning electron microphotograph of the thus obtained scandium oxide powder is shown in FIG. 1. From this photograph it is recognized that the powder consists of hexagonal bipyramid crystals. Also, the substance was confirmed to be scandium oxide by X-ray diffraction analysis (Philips PW-1700).

EXAMPLE 2

Figure 2:
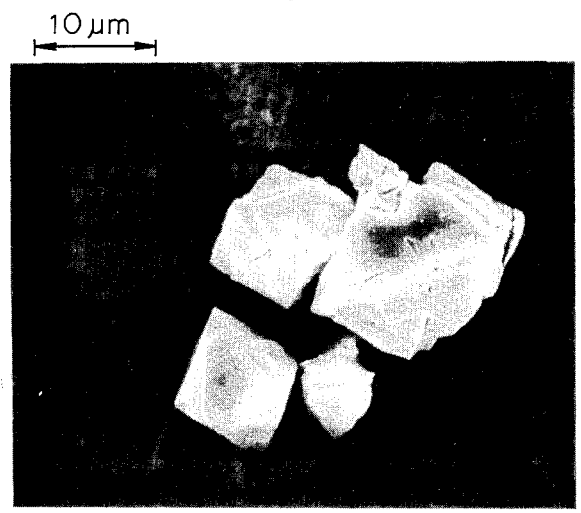

To 12 g of scandium oxide, 120 ml of concentrated nitric acid and 60 ml of water were added and heated to dissolve it. The solution was boiled down to 40 ml, water and nitric acid being evaporated. Thereafter, 900 ml of water was added to the concentrated solution, and further 40 g of ammonium chloride was added to adjust the pH of the solution to 1. Further 33.6 g of oxalic acid dihydrate was added to precipitate scandium oxalate. After the precipitate was aged in the mother liquor for 1 hours, it was treated in the same manner as in Example 1 and scandium oxide powder was obtained. A scanning electron microphotograph of the thus obtained scandium oxide powder is shown in FIG. 2. From this photograph it is recognized that the powder consists of hexagonal bipyramid crystals. Also, the substance was confirmed to be scandium oxide by X-ray diffraction analysis.

EXAMPLE 3

To 12 g of scandium oxide, 120 ml of hydrochloric acid and 60 ml of water were added and heated to dissolve it. The solution was boiled down to 40 ml, water and hydrochloric acid being evaporated. Thereafter, aqueous ammonia solution were added to adjust the pH of the solution to 1. This solution was treated in the same manner as in Example 1 and scandium oxide powder was obtained. The scanning electron microphotograph of this product was almost the same as that in FIG. 1, and thus the powder consisted of hexagonal bipyramid crystals. Also, the substance was confirmed to be scandium oxide by X-ray diffraction analysis.

Comparative Example 1

Figure 3:
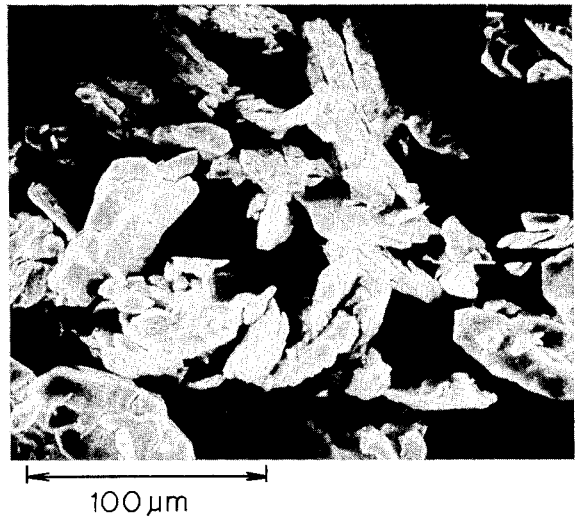
FIGS. 3 to 5 are scanning electron microphotographs showing particle structures of scandium oxide powders obtained by Comparative Examples 1, 2 and 3, respectively.

To 20 g of scandium oxide, 100 ml of concentrated nitric acid and 60 ml of water were added and heated to dissolve it. The solution was boiled down to 60 ml, water and nitric acid being evaporated. Thereafter, water was added to the concentrated solution to make 900 ml, and the pH of the solution was adjusted to 1 by addition of ammonia water. Further, 56 g of oxalic acid dihydrate was added to the solution and the solution was stirred for 1 hour. The mixture was treated in the same manner as in Example 1 and scandium oxide powder was obtained. A scanning electron microphotograph of the thus obtained scandium oxide powder is shown in FIG. 3. As seen in this photograph, the scandium oxid powder obtained by this comparative example is of columnar and is inferior in crystallization. Comparative Example 2

Figure 4:
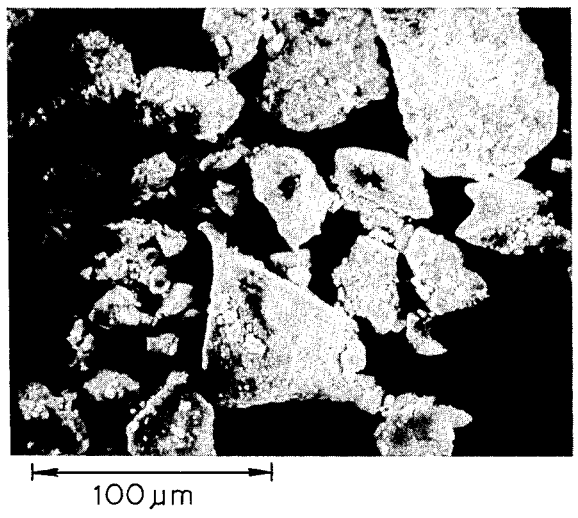

To a scandium-containing hydrochloric acid solution having a pH of 1 prepared in the same manner as in Example 1, ammonium hydroxide was added to adjust the pH thereof to 8. Thereafter, the formed scandium hydroxide was collected by filtration, and roasted at 700° C. in the air. A scanning electron microphotograph of the thus obtained scandium oxide is shown in FIG. 4. As seen in this photograph, the obtained scandium oxide was inferior in crystallization and that the particle size was not uniform. Comparative Example 3

Figure 5:
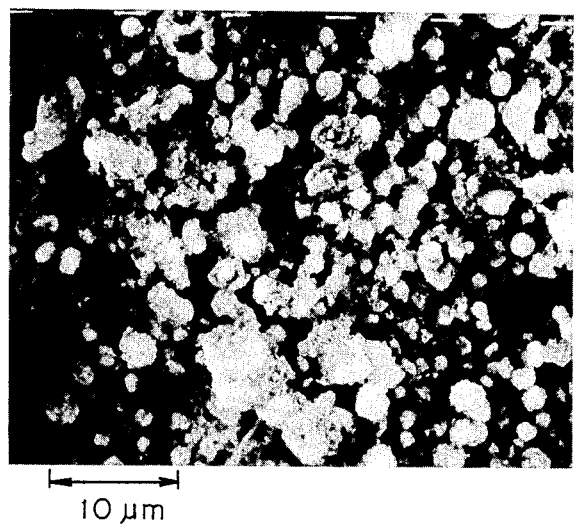

To a scandium-containing hydrochloric acid acid solution having a pH of 1 prepared in the same manner as in Example 1, ammonium carbonate was added to adjust the pH thereof to 8. Thereafter, the formed scandium carbonate was collected by filtration, and roasted at 700° C. in the atmosphere. A scanning electron microphotograph of the thus obtained scandium oxide is shown in FIG. 5. As seen in this photograph, the obtained scandium oxide was inferior in crystallization.

We claim:

1. Scandium oxide powder in the form of hexagonal bipyramid crystals.

* * * * *